United States Patent [19]

Butler, III

[11] Patent Number: 4,754,627
[45] Date of Patent: Jul. 5, 1988

[54] CLOSURE FOR A VEHICLE GASOLINE FILLER TUBE

[76] Inventor: Charles A. Butler, III, 3094 Village Pine Dr., #E, San Diego, Calif. 92073

[21] Appl. No.: 64,599

[22] Filed: Jun. 22, 1987

[51] Int. Cl.⁴ .............................................. B65D 55/14
[52] U.S. Cl. ......................................... 70/158; 70/258
[58] Field of Search ............................. 70/158, 166–173, 70/237, 258; 220/200, 203, 209, 210, 227, 252, 253, 345, 346, 351, DIG. 27, DIG. 33

[56] References Cited

U.S. PATENT DOCUMENTS

| | | | |
|---|---|---|---|
| 1,949,523 | 3/1934 | Wilson | 70/158 |
| 4,245,751 | 1/1981 | Neima | 220/210 |
| 4,317,345 | 3/1982 | Hinson | 70/170 |
| 4,579,244 | 4/1986 | Fukuta | 220/210 |
| 4,673,813 | 6/1987 | Sanchez | 220/253 |

Primary Examiner—Robert L. Wolfe
Attorney, Agent, or Firm—George J. Netter

[57] ABSTRACT

A lockable closure for a gasoline filler tube is provided including a threaded extension which can be tightly threaded into the upper open end of a vehicle filler tube. The closure housing has an opening extending through the housing to communicate with the filler tube cavity as well as a flat upper surface of the housing which provides a sealing surface for a vapor boot during refueling. A locking plate assembly has a pair of spaced apart plates slidably received in the closure housing for movement into covering relation to the cavity or radially outwardly to an extended position leaving the housing cavity exposed for fuel entry. The closure may be locked in place.

7 Claims, 2 Drawing Sheets

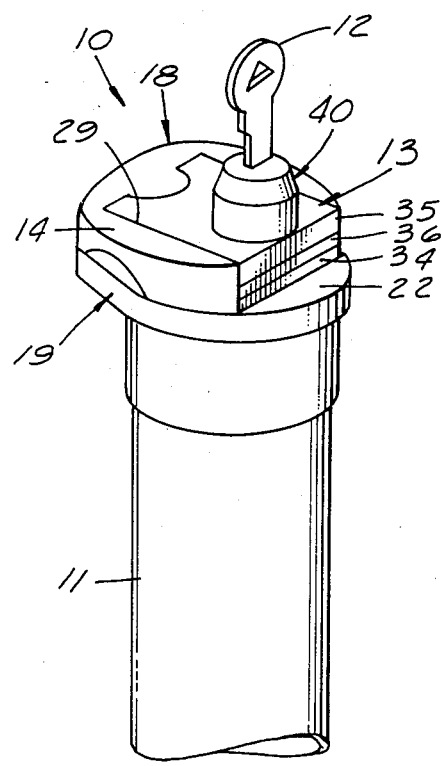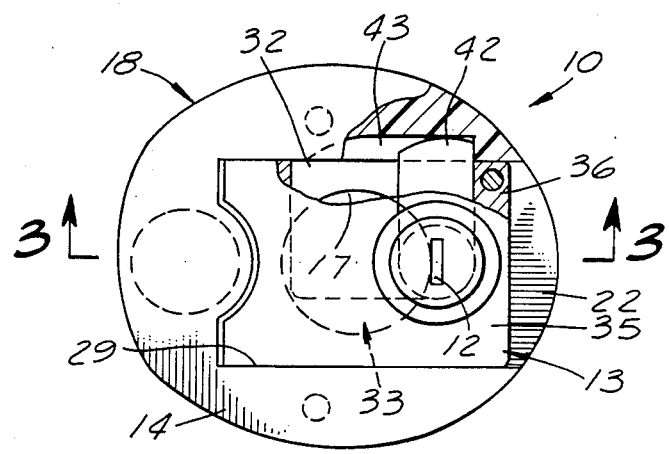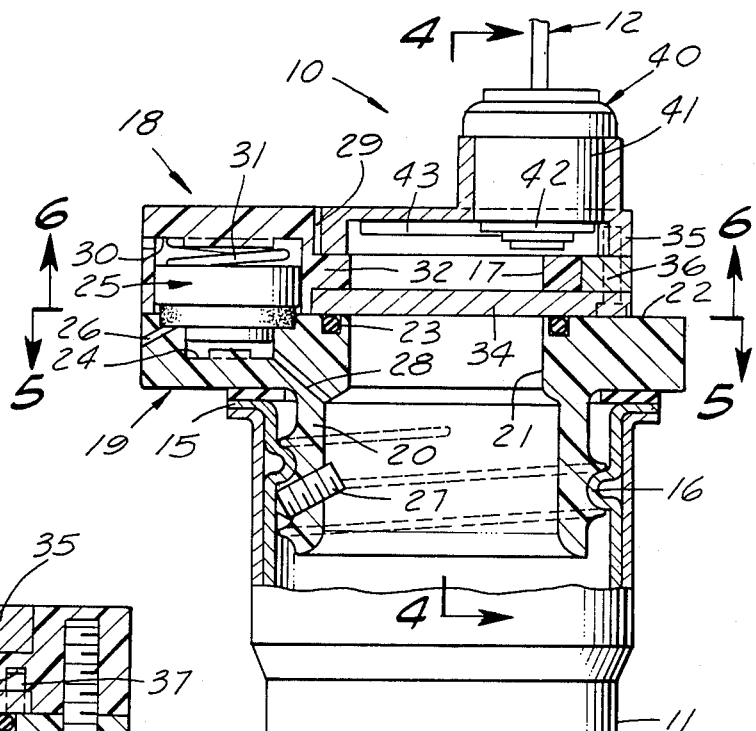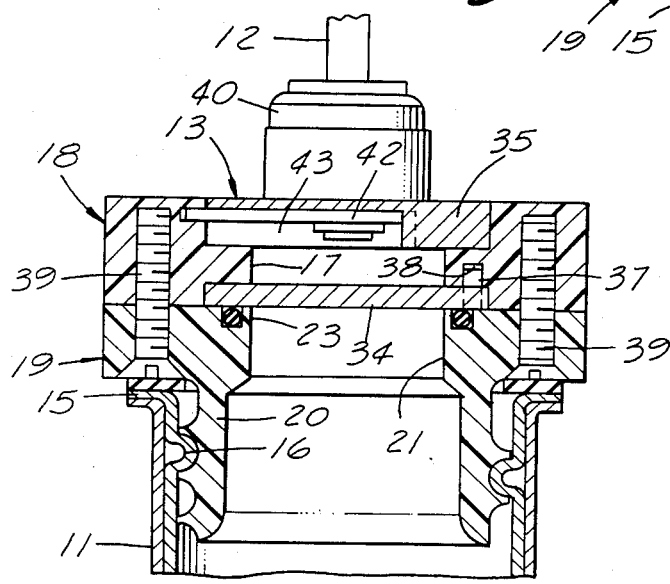

CLOSURE FOR A VEHICLE GASOLINE FILLER TUBE

FIELD OF THE INVENTION

The present invention relates generally to vehicle gasoline filler tubes and closures therefore and, more particularly, to a closure for such a filler tube of improved construction and operation.

BACKGROUND OF THE INVENTION

Standard original equipment with new automobiles includes so-called gas caps which are threaded onto the upper open end of gasoline filler tubes and removed therefrom by mere finger pressure rotation. However, it is useful to have such gas caps include a locking means of some sort to prevent gasoline from being stolen from the automobile or to prevent vandals from inserting substances into the gasoline tank to cause malfunction or destruction of the engine.

In addition, local state requirements, such as those of California, require that the filler tube be modified so as to accommodate vapor boot systems upper end, or a cap which is to remain on the filler tube during filling to insure that gasoline vapors will not be released into the adjacent environment when the tank is being filled. Also, it is now a customary requirement that a relief valve be provided to prevent buildup of undesirably high tank pressures which can cause explosion, for example. Many of the known past filler tube lock closures are not fully effective for use with a vapor boot system.

Still further, some known lock closures or locking gas caps once applied become a permanent fixture which cannot be easily removed.

Yet other forms of known locking gas caps are relatively difficult to mount to the filler tube which makes the device undesirable or impractical for sales to the aftermarket.

SUMMARY AND OBJECTS OF THE INVENTION

In accordance with the practice of the present invention, a lockable closure for a gasoline filler tube is provided including a threaded extension which can be tightly threaded into the upper open end of a vehicle filter tube. The closure housing has an opening which extends completely through the housing and communicates with the filler tube cavity as well as a flat upper surface of the housing which provides a sealing surface for the vapor boot of a typical filling nozzle at a service station.

Threaded means pass through the closure housing wall with one end extending into the housing cavity and the outer end which locks into the filler tube threads preventing unauthorized removal of the housing. The internal end of the locking means is protected from tampering by a plate when the closure is locked onto the filler tube.

A locking plate assembly includes a pair of spaced apart plates which are received in slots within the closure housing for movement into covering relation to the cavity or radially outwardly to an extended position leaving the housing cavity exposed for introduction of a gasoline fill nozzle, for example.

A locking detent is located between the two parallel plates and is rotatable with a key for positioning within a slot on the internal surface of the closure housing which serves to lock the plates into covering relation to the housing cavity preventing access thereto to anyone without the key. The detent is moved entirely between the locking plate when unlocked.

DESCRIPTION OF THE DRAWING

FIG. 1 is a perspective view of the locking closure means of the present invention shown affixed to the top of a gasoline filler tube.

FIG. 2 is a top plan view of the closure of FIG. 1.

FIG. 3 is a side elevational, sectional view taken along the line 3—3 of FIG. 2.

FIG. 4 is a further elevational view taken along the line 4—4 of FIG. 3.

DESCRIPTION OF A PREFERRED EMBODIMENT

Figure 5:
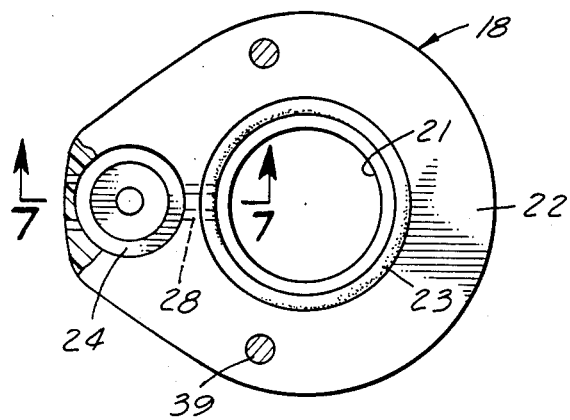
FIG. 5 is a top plan sectional view taken along the line 5—5 of FIG. 3.
Figure 6:
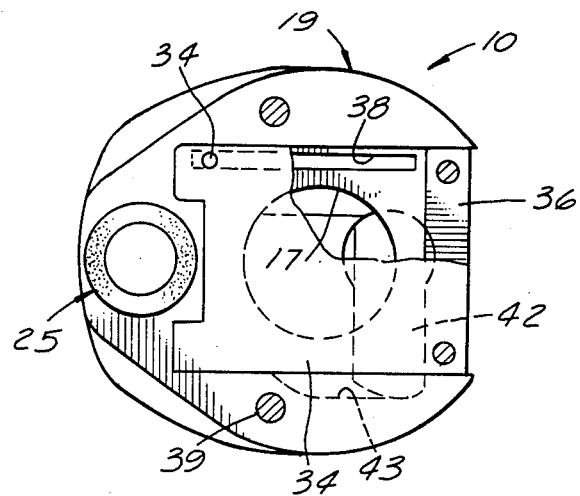
FIG. 6 is a bottom plan sectional view taken along the line 6—6 of FIG. 3.
Figure 7:
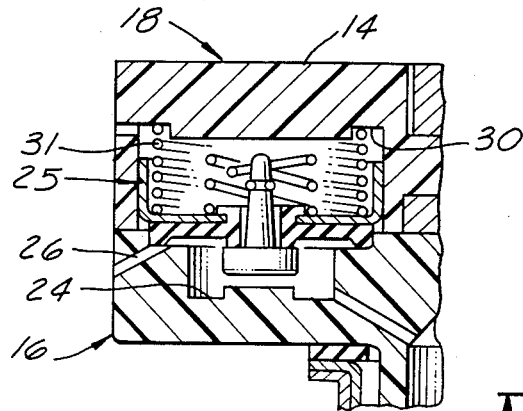
FIG. 7 is a detailed side elevational, sectional view taken along line 7—7 of FIG. 5.

Turning now to the drawings, and particularly FIG. 1, there is depicted a locking closure 10 shown secured to the upper end of a typical vehicle gasoline filler tube 11. As will be described, the closure 10 may be locked by means of a removable key 12 in order to prevent unauthorized access to the open upper end of the filler tube 11. Also, when unlocked, a plate assembly 13 can be moved to the side exposing the open upper end of the fill tube for entrance of a gasoline fill nozzle. It is important to note that the top surface of the locking closure identified generally as 14 is flat so that when in the open condition and gasoline is being added to the filler tube 11, a vapor boot (not shown) which is required in many states (e.g., California) will seal to the surface removing dangerous and toxic gasoline vapors.

As can be seen best in FIGS. 3 and 4, the upper end of the filler tube 11 has an outwardly extending flange 15 with a smooth flat upper surface. On the inner surface adjacent the open end, the filler tube wall is formed into screw threads 16 which approximates a single full thread. This construction of the filler tube 11 is typical for many present day automotive vehicles and does not form an essential part of the invention to be described.

The housing for the locking closure 10 includes a first disk 18 of generally oval configuration which is assembled with a similarly shaped second disk 19, the latter having an extension 20 from its lower major surface that is threaded for receipt within the upper end of the filling tube.

The housing disk 19 has a central opening 21 which extends completely through the disk as well as the threaded extension 20. The outer top surface 22 of the member 19 (i.e., on side opposite to 20) is a flat plane and includes a circular groove surrounding the opening 21 within which is received an O-ring 23. The top surface of the disk 19 adjacent the opening 21 also includes a cavity 24 formed therein circular in crosssection for slidingly receiving a button valve 25 (FIG. 3). The wall of 19 includes a plurality of passages 26 extending from the outer periphery into the cavity 24 for a purpose to be described.

A locking screw 27 within the wall of the extension 20 is arranged at an angle to the opening axis. The locking screw 27 serves to lock the extension 20, and thus the remainder of the closure 10, tightly within the filler tube such that it cannot be removed without unlocking the device.

Still referring to FIG. 3, a plurality of passages 28 extend from the inner wall defining the opening 21 in the disk 19 into the cavity 24. In a way that will be more particularly described, these passages 28 provide an escape route for gasoline vapors coming from the tank upwardly through the passages 28 into the cavity 24 and outwardly through passages 26 when the button valve is moved to the valving condition. That is, when the force of the vapor pressure becomes sufficiently high, it will move the button valve out of its obstructing position and permit the vapor to escape.

The upper housing disk 18, as already noted, is of substantially similar geometry to the disk 19 and includes a central cavity 17 which aligns with the opening 21 in disk 19 on assembly. Also, a cavity 30 formed in a major surface which on assembly faces surface 22 and aligns with the cavity 24 so as to provide additional space within which the button valve can move. A coil spring 31 has one end in contact with the button valve and its upper end in contact with the inner wall defining cavity 30 resiliently urging the button valve downwardly and into sealing contact with wall surfaces defining cavity 24.

The cavity 29 is generally rectangular, extends completely through the disk 18 to communicate with opening 21, and opens out at one side of the disk 18. A wall 32 extends inwardly from the cavity 29 at a point midway through the disk 18. Also, the inner edge of wall 32 defines a generally cylindrical opening 33.

The slide plate assembly 13 consists of first and second rectangular metal plates 34 and 35 (Figures 3 and 4) held in aligned spaced apart relation by an intervening spacer 36. That is, the two plates 34 and 35 are cantilevered from the spacer 36 at such a distance as to enable their receipt within the cavity 29 one at each side of wall 32. The lower surface of plate 35 is dished out to receive locking mechanism parts to be described.

Figure 8:
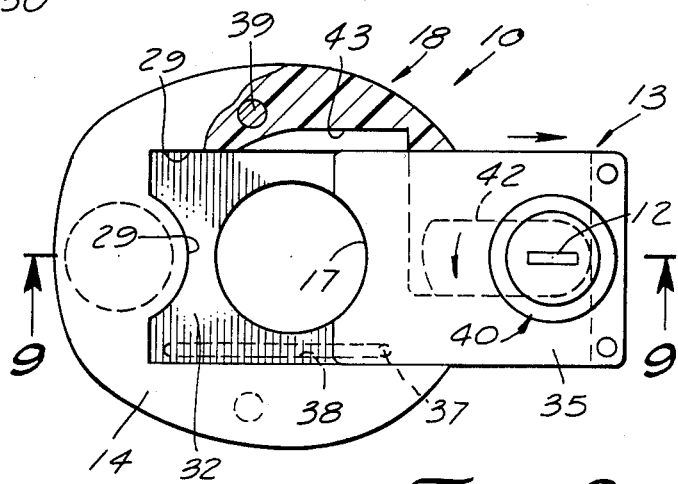
FIG. 8 is a top plan view similar to FIG. 2 showing the locking plate in released or open condition.
Figure 9:
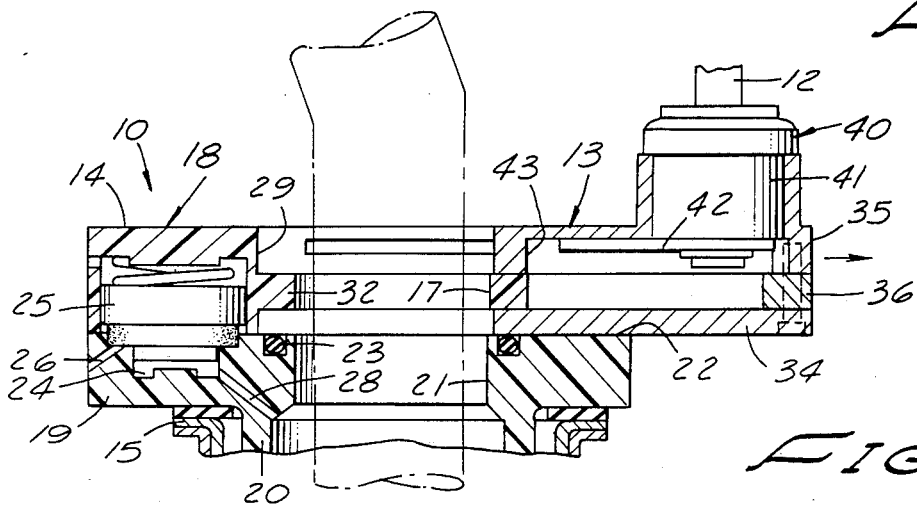
FIG. 9 is a side elevational, sectional view taken along line 9—9 of FIG. 8.

As can be seen in FIGS. 8 and 4, a pin 37 carried by the metal plate 34 has a portion extending upwardly to ride in a slot 38 within the edge wall defining the housing disk 18. In this way, the slide plate assembly 13 can be moved from a fully closed positions as shown in FIG. 1, for example, to a position such as shown in FIG. 8 in which the cavity 29 and circular opening 33 are exposed. The pin 37 serves as a limit stop to prevent complete removal of the slide plate assembly from the housing disk 18. Also, at the fully open limit position plate 34 overlies and retains O-ring 23 within its groove.

Assembly of the discs 18 and 19 to one another is accomplished by a pair of threaded means 39 as shown in FIG. 4. It is to be noted that the heads of the threaded means should be located on the lower surface of disk 19 for security purposes.

The locking means 40 for the closure 10 is of conventional cylinder form 41 rotatably secured within an opening in the plate 35. The inner end of the cylinder 41 is affixed to a detent 42. In a way well known to the locking art, a proper key 12 inserted within the lock cylinder enables locating the detent in either the unlocked position where the detent lies entirely within the dished out undersurface of plate 35, or with a detent end portion locked within a slot 43 in the adjacent disk wall.

I claim:

1. Closure for the end of a vehicle fuel tank filler tube, comprising:

a first disk having an opening extending through the major surfaces and a shallow cavity on a major surface;

a second disk having an opening passing through the second disk major surfaces and a shallow cavity, said second disk being mounted onto the first disk with the respective openings being aligned and the shallow cavities directly opposite one another, a groove surrounding the second disk opening and facing the first disk, and an upstanding wall on the second disk surrounding the opening therein for being received within the filler tube end;

a plate assembly including first and second plates connected at one edge to hold the plates in generally parallel spaced apart relation, said first plate being slidingly located within a groove in an outer surface of the first disk and second plate slidingly received within a space formed between the first and second disks;

said plate assembly being slidable from a first limit covering the aligned openings in the first and second disks to a second limit allowing access to said aligned openings from outside the disks;

an O-ring seal located within the second disk groove surrounding the second disk opening; and a guide pin affixed to the second plate having an end portion lying within a slot formed in the first disk serving to define the limits of sliding movement of the plate assembly with respect to the first and second disks.

2. Closure as in claim 1, in which an outer surface of the first disk is coextensive with an outer surface of the first plate enabling sealing relation with a vapor boot during addition of fuel to the filler tube.

3. Closure as in claim 1, in which the upstanding wall on the second disk includes a threaded opening and means threaded therein to lockingly engage the filler tube.

4. Closure as in claim 1, in which button valve means are included within the facing disk cavities controlling fuel vapor flow from first passages through the second disk interconnecting the second disk opening and cavity and second passages in the second disk interconnecting the second disk cavity and the exterior.

5. Closures as in claim 1, in which threaded means unitarily connect the first and second disks, said threaded means having head portions extending externally of the second disk and resting on the filler and when the closure is assembled onto the filler tube.

6. Closure as in claim 1, in which a locking means is mounted on the first plate for selectively locking the plate assembly to the first disk.

7. Closure as in claim 1, in which the second plates overlying and retaining the O-ring within second disk groove when the plate assembly is located at the second limit.

* * * * *